United States Patent [19]

Leonard

[11] 4,030,373

[45] June 21, 1977

[54] VARIABLE SPEED DRIVE FOR A BICYCLE

[75] Inventor: Hamlin Leonard, Darien, Conn.

[73] Assignee: B-5 Associates of Stamford, Connecticut, Stamford, Conn.

[22] Filed: Nov. 20, 1975

[21] Appl. No.: 633,862

[52] U.S. Cl. .......................... 74/230.19; 74/217 B; 74/242.11 A; 74/244

[51] Int. Cl.² .................. F16H 55/54; F16H 9/00; F16H 7/12; F16H 55/30

[58] Field of Search ....... 24/230.19, 230.18, 230.2, 24/230.21, 230.22, 230.23, 244, 242.11 A, 217 B

[56] References Cited

UNITED STATES PATENTS

| | | | |
|---|---|---|---|
| 885,710 | 4/1908 | Barker | 74/230.19 |
| 1,126,195 | 1/1915 | Granz | 74/230.19 |
| 1,198,451 | 9/1916 | Juarez | 74/230.19 |
| 1,776,339 | 9/1930 | Siqueland | 74/230.19 |
| 2,603,978 | 7/1952 | Gaisset | 74/230.22 |
| 3,087,349 | 4/1963 | Herting et al. | 74/230.18 |
| 3,150,529 | 9/1964 | Walk | 74/230.19 |
| 3,198,025 | 8/1965 | Péras | 74/242.11 S |
| 3,802,286 | 4/1974 | Winkholfer et al. | 74/242.11 S |
| 3,838,606 | 10/1974 | Scalise | 74/242.11 S |
| 3,938,403 | 2/1976 | Donaldson | 74/230.23 |

Primary Examiner—Leonard H. Gerin
Attorney, Agent, or Firm—Martin Novack

[57] ABSTRACT

The invention is directed to a variable speed drive for a bicycle. In accordance with the invention there is provided a variable diameter driving mechanism rotatably mounted on the bicycle, the mechanism including a mounting plate having a plurality of radial tracks therein. A plurality of movable sheave elements are each mounted in one of the tracks, each sheave element having a releasable retaining means which normally retains it at a substantially fixed radial position in its track. A flexible driving means, preferably a V-belt, is partially wrapped around the driving mechanism and engages different adjacent ones of the sheave elements depending on the rotational orientation of the driving mechanism. A gate or interposing means is positioned to sequentially coact with the non-engaged sheave elements and is operative, under manual control, to release the retaining means of a sheave element to allow radial motion of the sheave element. Also, means are provided for applying a radial bias to the released sheave elements. In the preferred embodiment of the invention, the gate means is movable radially under manual control and coacts with the sheave elements only when the gate means is at a different radial reference than the sheave elements. In this preferred embodiment, the radial tracks are radial slots in the plate and each sheave has two symmetrical arcuate belt-carrying surfaces which protrude from opposite sides of the mounting plate. Accordingly, a pair of drive belts can be utilized on opposite sides of the mounting plate for a balanced drive. Further, in this preferred embodiment a pair of variable diameter driving mechanisms, as defined, are employed, one at the front pedal drive and the second at the rear wheel drive. Means are provided for varying the diameters of these two mechanisms in opposite relationship under manual control.

18 Claims, 12 Drawing Figures

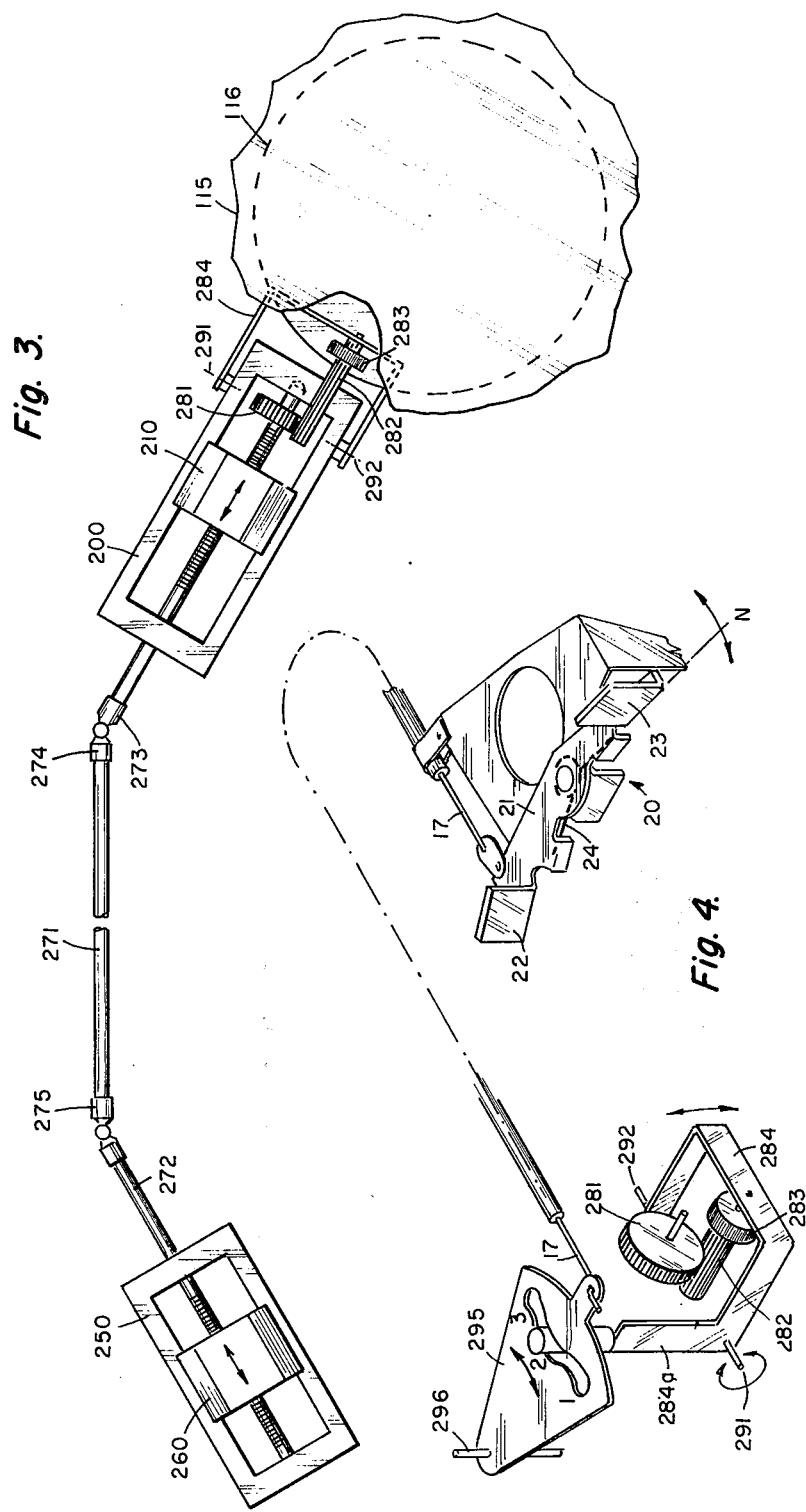

VARIABLE SPEED DRIVE FOR A BICYCLE

BACKGROUND OF THE INVENTION

Bicycling has enjoyed a great revival of interest in recent years. This has been due in part to recent emphasis on exercise as well as environmental considerations such as the pollution problems caused by extensive automobile use. With bicycles being used in a variety of riding conditions, multi-speed bicycles, and particularly 10-speed bicycles, have come into widespread use. These bicycles include means for varying the transmission ratio as between the pedaling force and the rear wheel of the bicycle, the ratio being periodically adjusted by the rider in accordance with the speed obtained and the grade of the terrain. The conventional transmission ratio changing means on five and 10-speed bicycles is the so-called "derailleur" mechanism. Derailleur mechanisms utilize multiple side by side sprockets of different diameters and operator-controlled shift levers are utilized to activate the derailleur mechanism which, in turn, causes motion of the chain in a direction lateral to the sprocket axes. In this manner, the chain is caused to move from one sprocket to another of greater or lesser diameter.

There are a number of well-recognized problems with derailleur type systems, although satisfactory improvements or substitutes therefor have not been previously attained. The chain jumping from sprocket to sprocket can readily "hang up" or, at best, be subjected to wear which necessitates realignment and/or replacement of parts. In certain gears there is a substantial lateral displacement of the chain as between its front and rear sprockets, and this makes pedalling difficult and inefficient as well as causing greater than average wear. This serves to render some of the gears of a 10-speed bicycle virtually unusable. All present chain-drive bicycles are quite susceptible to the problems caused by road dirt, and the amount of friction and stress encountered by a derailleur mechanism during shifting makes this mechanism particularly susceptible to problems caused by road dirt.

A further disadvantage of derailleur mechanisms is the difficulties they pose from the standpoint of maintainability. For example, disassembly of at least a part of the mechanism and chain is necessary when removing the rear wheel. Also, under present designs, the chain is "trapped" around the lower support bar of the bicycle, so that it is necessary to "break" the chain at one link in order to remove or replace it.

There have been a number of recent attempts to device alternatives to the conventional derailleur, some of the proposed techniques being described in an article entitled "New Transmissions: More Push-Power for Your Bike" which appeared in the May 1974 issue of POPULAR SCIENCE. These types of systems are also described in an article entitled "Product Report" at page 43 of the February 1974 issue of BICYCLING and in U.S. Pat. Nos. 3,798,989, 3,800,613, and 3,850,044. In one of these systems a mechanism changes the primary gearing ratio by increasing or decreasing the distances between six miniature sprockets which are coupled together on hinged arms and move radially in unison to vary the effective diameter of the "sprocket group." Each sprocket is provided with a clutch shoe which is frictionally engageable with a common clutch plate on a drive shaft. In one system, the miniature sprockets ride in and out in the grooves of a spiral "scroll" plate. A disadvantage of these types of systems is that since all the miniature sprockets are coupled together it is difficult for them to move outward under load, so the rider is required to pedal backwards in order to shift up. Also, these types of systems appear to be limited in their application to the front sprocket assembly since their design is not suitable for rear wheel sprockets due to size limitations. This tends to limit the gear ratio range capabilities of such devices.

In another of the systems described in the above-referenced publications and patents, a set of sliding gear segments are radially interposed under operator control. This system has only a limited number of available gear ratios, however. Also, all of the prior art problems attendant the use of an exposed gearing mechanism and chain are still present.

It is an object of this invention to provide a bicycle drive transmission system which overcomes remaining problems in the prior art, as set forth.

SUMMARY OF THE INVENTION

The present invention is directed to a variable speed drive for a bicycle. In accordance with the invention there is provided a variable diameter driving mechanism rotatably mountable on the bicycle, the mechanism including a mounting plate having a plurality of radial tracks therein. A plurality of movable sheave elements are each mounted in one of the tracks, each sheave element having a releasable retaining means which normally retains it at a substantially fixed radial position in its track. A flexible driving means, preferably a V-belt, is partially wrapped around the driving mechanism and engages different adjacent ones of the sheave elements depending on the rotational orientation of the driving mechanism. A gate or interposing means is positioned to sequentially coact with the non-engaged sheave elements and is operative, under manual control, to release the retaining means of a sheave element to allow radial motion of the sheave element. Also, means are provided for applying a radial bias to the released sheave elements.

In the preferred embodiment of the invention, the gate means is movable radially under manual control and coacts with the sheave elements only when the gate means is at a different radial reference than the sheave elements. In this preferred embodiment, the radial tracks are radial slots in the plate and each sheave has two symmetrical arcuate belt-carrying surfaces which protrude from opposite sides of the mounting plate. Accordingly, a pair of drive belts can be utilized on opposite sides of the mounting plate for a balanced drive. Further, in this preferred embodiment a pair of variable diameter driving mechanisms, as defined, are employed, one at the front pedal drive and the second at the rear wheel drive. Means are provided for varying the diameters of these two mechanisms in opposite relationship under manual control.

Further features and advantages of the invention will become more readily apparent from the following detailed description when taken into conjunction with the accompanying drawings.

BRIEF DESCRIPTION OF THE DRAWINGS

FIG. 3 and 4 illustrate operation of the ratio control assembly and operation of the movable gates in accordance with an embodiment of the invention.

DESCRIPTION OF THE PREFERRED EMBODIMENT

Figure 1:
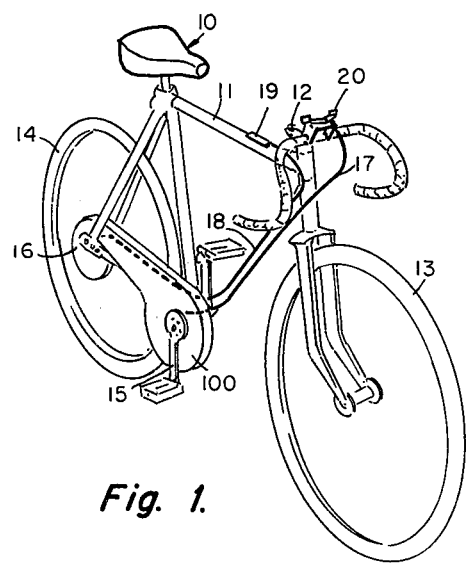
FIG. 1 shows a bicycle having a variable speed apparatus in accordance with the invention.

Referring to FIG. 1, a bicycle 10 is shown having a frame 11, handlebars 12, a front wheel 13, and a rear driving wheel 14. A pedal crank and hub 15 provide the impetus to a variable speed drive apparatus 100 which couples to the driving wheel 14 and is enclosed in a removable cover 16. The cover 16 consists of two essentially identical halves (the left side not visible in FIG. 1), each having front and rear mounting apertures, and is preferably formed of plastic and fit together with plastic tabs or any suitable removable connecting means.

A control cable 17 is coupled from the variable speed drive 100 to a thumb-operated ratio-control assembly 20 which is centrally mounted on handlebars 12. As will be further described, the ratio-control assembly is operative under control of the rider to increase or decrease the drive ratio of variable speed drive 100. Unlike conventional controls, such as the gear shift lever of a derailleur, the present control assembly 20 does not assume various analog positions which determine the drive ratio. Rather, the assembly 20 is normally in a "neutral" position, and changes in the drive ratio are effected by temporary activation of the assembly 20 to either its "increase" or "decrease" positions. A ratio-indicator cable 18 is coupled from variable drive 100 to a ratio indicator 19 which is mounted on the horizontal bar of frame 11. As will become apparent, the position of cable 18 is determined by the position of a gate to which it is coupled, the gate, in turn, determining the drive ratio of the variable speed drive. The ratio indicator has a linear scale thereon and, as the cable moves, its end indicates the drive ratio by its position with reference to the scale.

Figure 2:
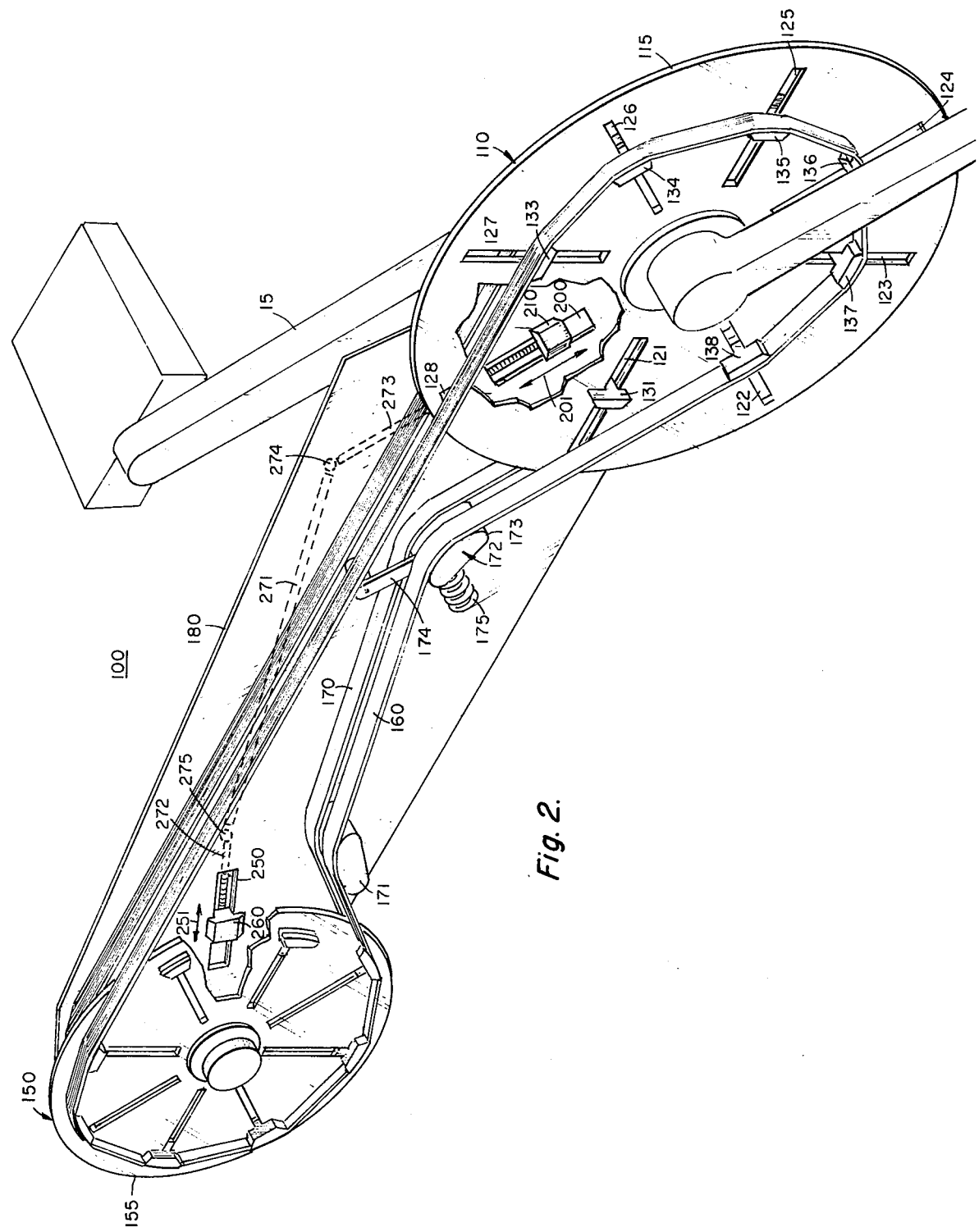
FIG. 2 is a schematic partially cut away view of a variable speed drive apparatus in accordance with an embodiment of the invention.

Referring to FIG. 2, there is shown a schematic, partially cutaway, view of the variable speed drive 100 in accordance with the invention. A front variable diameter driving mechanism 110 is rotatably mounted on the bicycle frame 11 (e.g. by conventional front drive shaft means, not shown) and coupled to the pedal crank 15. The mechanism 110 includes a circular mounting plate 115 having a plurality of radial tracks therein, the present embodiment having eight slots which serve as tracks designated 121 through 128, the track 122 being only partially visible in the FIGURE. A plurality of movable sheave elements, one for each track, are designated 131 and 133–138 (the eighth sheave not being visible in the FIGURE). Each sheave element has central slots which engage the walls of its corresponding track, in a manner to be described, and a pair of belt-carrying surfaces which protrude symmetrically from opposite sides of the mounting plate 115. In FIG. 2, only one belt-carrying surface of each sheave is visible, the opposite belt-carrying surface being on the "back" (non-visible) side of the plate 115.

A rear variable diameter driving mechanism 150 is mounted on a portion of a "free-wheeling" mechanism, such as the ratchet wheel of a pawl-and-ratchet free-wheeling mechanism, the pawl-containing portion of the free-wheeling mechanism being coupled to the rear wheel 14. The rear variable diameter mechanism can be visualized, for the present, as a smaller diameter version of the front variable diameter mechanism. Specifically, it comprises a circular mounting plate 155 having eight slots, each slot (or track) having a movable sheave element mounted therein, the sheave elements being preferably the same as those described in conjunction with the front mounting plate 115.

A first drive belt 160, visible in its entirety in FIG. 2, is wrapped around and thereby couples the front and rear variable diameter driving mechanisms, by virtue of engaging the visible belt-carrying surfaces of the sheave elements. A second drive belt 170, partially visible and shown partially in dashed line, is essentially identical to belt 160 and operates in balanced unison therewith, the belt 170 engaging the other (non-visible) belt-carrying surfaces of the sheave elements. The belts also pass over a fixed idler 171 and a spring-loaded belt-tensioning device 172, both of which are mounted on a lightweight frame 180 which may be formed of aluminum and/or plastic. The frame has rear and front annular retainers (not shown) which allow mounting over the rear axle and the front drive shaft, respectively. The belt-tensioning device 172 includes an idler 173 which is mounted on a rod 174 that is pivotally mounted on the frame 180. A spring 175, also mounted on the frame, provides the desired tension.

Front and rear gate housings, designated by the reference numerals 200 and 250, respectively, are mounted on the frame 180 and disposed at relative circumferential positions with respect to the "wrap" of the drive belts 160 and 170 to allow interaction with the sheave elements which are instantaneously disengaged from the belts. The gate housings 200 and 250 respectively contain gates 210 and 260 which are slidable in the gate housings within limits depicted by the double-headed arrows 201 and 251. The gates are thus seen to move in directions which correspond to the radial direction with respect to the circular mounting plates 115 and 155. The gates 210 and 260 are effectively coupled by elongated rods 271, 272 and 273 which are joined together by universal joints at 274 and 275, as shown. In a manner to be described hereinafter, the rods operate to move the gate 260 in opposite radial direction than the gate 210, so as the gate 210 moves radially inward the gate 260 moves radially outward, and vice-versa. The gate 210 is coupled to the ratio control assembly 20, in a manner to be described, so the position of the gate 210, and accordingly the gate 260, is under control of the bicycle rider.

The gates 210 and 260 are positioned to sequentially coact with non-engaged (i.e., out of engagement with the belt) sheave elements. Each sheave element has a releasable retaining means, to be described, which normally retains it at a fixed radial position in its track. When a sheave element coacts with the gate, the retaining means is released and a radial bias is applied to the sheave element to move it radially inward or outward. In the present embodiment, the gate (actually, both the front and back gates) coacts with the sheave elements only when the gate is at a different radial reference than the sheave elements. Also, in this embodiment the radial bias is applied by the gate itself and urges each passing sheave element toward a position which corresponds to its (i.e., the gates) own position.

Overall operation of the variable speed drive 100 can now be understood in general terms as follows: During normal operation (when not shifting to a different drive ratio), the gates 210 and 260 are at the same relative radial position as the sheave elements which therefore pass the gates without incident. Now, assume that the rider wishes to shift to a higher gear. This is done by urging the ratio-control assembly 20 to its "increase" position which, in turn, causes the gate 210 to move radially outward and gate 260 to move radially inward. When this is done, the gate 210 will coact with each sheave element of the front mechanism 110 and cause it to move radially outward until it again aligns with the gate 210, and the gate 260 will coact with each sheave element of the rear mechanism 150 and cause it to move radially inward until it again aligns with the gate 260. Thus, the drive ratio is increased twofold; i.e., by the coordinated increase in the effective diameter of the front mechanism 110 and decrease in the effective diameter of the rear mechanism 150. It can be noted that the sheave elements are acted upon only when disengaged from the drive belts; that is, not under load, so up or down shifting is readily accomplished without undue stress. As will become clearer, at a given pedaling rate, the amount of time that the ratio-control assembly is activated will determine the degree to which the gates 210 and 260 move and, accordingly, determine the drive ratio attained.

Referring to FIGS. 3 and 4, the ratio control assembly 20, and the manner in which it effects the desired movement of the gates 210 and 260, are shown in further detail. FIG. 3 illustrates the front and rear gate housings 200 and 250 and the gates 210 and 260 (shown in block form) which are constrained to move in their respective gate housings. The gates 210 and 260 have central threading and ride on threaded portions of the rods 273 and 272, respectively. The threading on the rods is in the same direction, such that rotation of the rods 273 and 272 (which rotate together via connecting rod 271 and universal joints 274 and 275) causes the gates to move in opposite radial directions with respect to their associated variable diameter mechanisms. Rotation of the rod 273 is caused by rotation of a gear 281 attached thereto, the gear 281 being rotated, in turn, by a pinion 282 to which it is engaged. A friction wheel 283 is mounted over the pinion 282, the pinion and friction wheel being normally positioned a short distance behind the circular mounting plate 115 (see FIG. 2) and near the center thereof. Mounted on the front drive shaft behind the plate 115 and parallel thereto is an auxiliary circular plate 116 of relatively small diameter. As seen in FIG. 3, the pinion and friction wheel are located equidistant the plates 115 and 116. The pinion 282 and friction wheel 283 are mounted on a rocker bracket 284 which pivots at points 291 and 292 so that the friction wheel contacts either the plate 115 or the auxiliary plate 116. It is readily seen that when the friction wheel is in contact with the plate 115 the pinion rotates in one direction, whereas when the friction wheel is in contact with the plate 116 the pinion rotates in the opposite direction.

FIG. 4 illustrates the ratio control assembly 20 which comprises a control lever 21 having curved ends 22 and 23 which serve as thumb switches for the left and right thumbs of the bicycle rider. A torsion spring 24 maintains the lever 21 in its normal "neutral" position. The cable 17, which is conventional bicycle cable in casing, is coupled between the lever 21 and cam unit 295 which is pivotally mounted at point 296 which is on the block 200. The unit 295 has a cam with three dwell positions designated 1, 2 and 3, and rocker bracket 284 has an arm 284A (which goes perpendicularly into the paper in FIG. 3) which engages the cam in unit 295. At the neutral position of lever 21 the arm 284A is at dwell position 2, at which the rocker bracket 284 is centrally positioned between the plates 115 and 116 and the friction wheel does not touch either plate. When the thumb switch 22 is depressed, the cable pulls the unit 295 to a position where arm 284 is at dwell position 1, and this causes the rocker bracket 284 to pivot (up in FIG. 4) such that the friction wheel 283 contacts the plate 116. When the thumb switch 23 is depressed, the cable pushes the unit 295 (only a small force is necessary and the cable can exert the required force without buckling) to a position where arm 284A is at dwell position 3, and this causes the rocker bracket 284 to pivot (down in FIG. 4), such that the friction wheel 283 contacts the plate 115.

In the described manner it is seen that depression of the thumb switches 22 or 23 results in motion of the gates 210 and 260 which, in turn, determines the drive ratio of the variable speed drive 100. It will be understood that the rate at which the gates move is a function of the pedaling speed since this determines the rate of rotation of pinion 282.

Figures 5, 6:
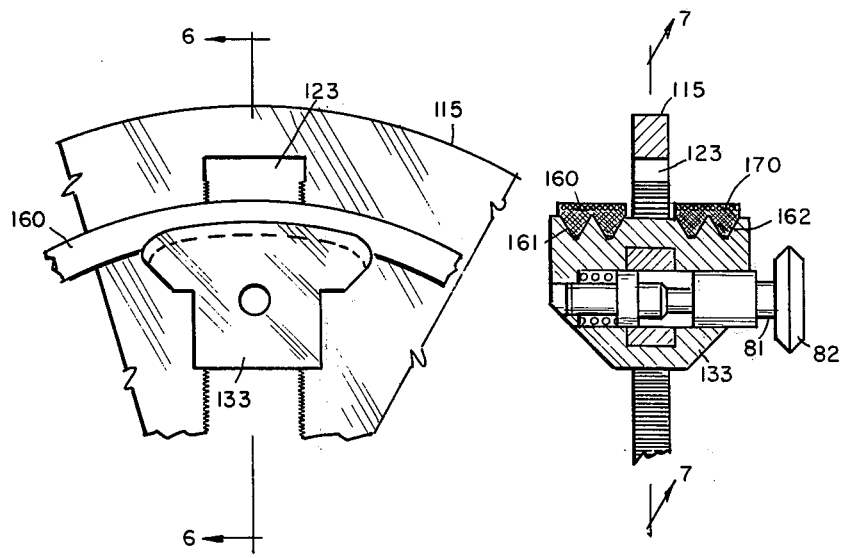
FIG. 5 is a side cut away view of a sheave element as shown in a track in the mounting place in accordance with an embodiment of the invention.
FIG. 6 is a cross-sectional view that is taken through a section defined by arrows 6—6 of FIG. 5.

FIGS. 5–9 illustrate the structure, operation, and interaction of the sheave elements, e.g. 133–138, and the gates 210 and 260 in accordance with the present embodiment of the invention. FIG. 5 is a side cutaway view of a sheave element (sheave element 133 is taken as representative) in the slot or track 123 of the front mounting plate 115 (also taken as representative). The track has serrated edges on both sides to normally retain the sheave at a fixed radial position, as will be described. The sheave element has arcuate belt-carrying surfaces 161 and 162 which are double-v grooved to receive double-v belts 160 and 170 (see also FIG. 6). Applicant has discovered that the use of a multiple-v belt is advantageous in this system in offering superior gripping characteristics and allowing wider-angle gripping surfaces which improve efficiency; i.e., less extra energy is required to "extricate" the belt from the grooves than in the case of a single-v belt which requires a sharper angle and tends to get "wedged" in its groove. The sheave element 133 has a pin 81 which extends from one side thereof, the pin having a head 82. As is seen in FIG. 6, the pin 81 is an extension of a shaft 83 which varies in diameter as shown and is movable laterally.

Figures 7A, 7B:
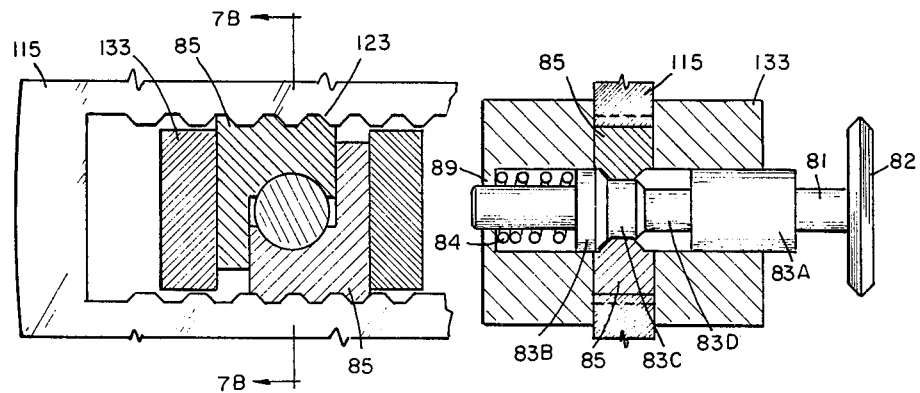
FIG. 7A shows a cross-sectional view of a sheave element as taken through section defined by arrows 7—7 of FIG. 6.
FIG. 7B is a cross-sectional view of the sheave element as taken through a section defined by arrows 7B—7B of FIG. 7A.

FIGS. 7 and 8 illustrate the manner in which the sheave elements are retained in their tracks and, from time-to-time, released from retention. Within the body of sheave element 133 is a pair of locking dogs 85 which are L-shaped and have external teeth which match the serrations of track 123. These locking dogs are rounded to surround the shaft 83 and are proportioned, when surrounding an intermediate diameter portion of the shaft 83, to lock in the track 123, as shown in FIGS. 7A and 7B. The shaft 83 has formed thereon outer diameter rings 83A and 83B which conform to the central bore in sheave element 133. The ring 83B tapers to an intermediate diameter ring 83C which, in turn, tapers to an inner diameter ring 83D. A small coil spring 84 is compressed between an annular flange 89 and the outer diameter ring 83B, the spring tending to normally bias the shaft 83 outward, so that the locking dogs 85 surround the intermediate diameter ring 83C. The outer diameter ring 83B also limits the outward excursion of shaft 83. As is seen in FIGS. 7A and 7B, the locking dogs 85 are "spread" by the intermediate diameter ring 83C to cause the retention of the sheave at a fixed position by virtue of the teeth on dogs 85 locking into the serrations in track 123.

Figures 8A, 8B:
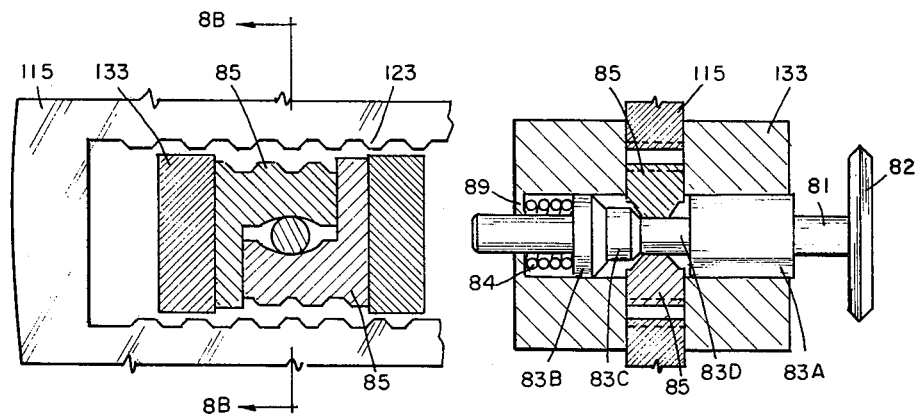
FIG. 8A is a cross-sectional view of the sheave element of FIG. 7A as shown in its unlocked position.
FIG. 8B illustrates the sheave element of FIG. 7B as shown in its unlocked position.

FIGS. 8A and 8B illustrate how the sheave elements are released from retention when the head 82 on shaft 83 is forced inward (as is sometimes caused by gate 210 in a manner to be described).

As the shaft moves inward, the locking dogs 85 no longer surround the intermediate diameter ring 83C, but now surround inner diameter ring 83D. The resulting clearance allows the sheave element to momentarily slide radially in the track 123. When the force on the head 82 is removed, the spring 84 returns the shaft 83 to its original position and the sheave element once again locks in place.

Figure 9:
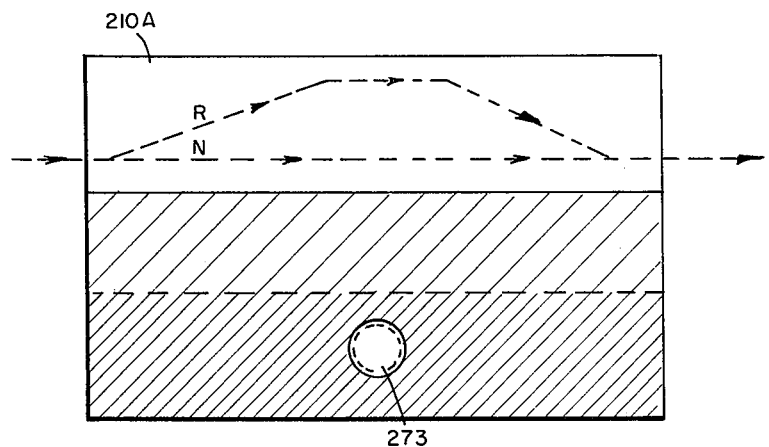
FIGS. 9 and 10 illustrate operation of the gate means in accordance with an embodiment of the invention.

FIG. 9 illustrates the operation of the gate 210 (or 260) and its interaction with the sheave elements. The gate, it will be recalled, moves on threaded rod 273 (FIG. 3), so the gate's direction of motion in FIG. 9 is perpendicular to the plane of the paper. The gate has two "channels" in which the pin head 82 of a sheave element can travel. When the passing sheave element is radially aligned with the gate (FIG. 2), the sheave element's pin head 82 travels along the straight path indicated by the arrow labelled "N." This is the normal condition when shifting is not occurring, and in such case the head 82 passes through the channel without touching the gate structure (see also FIG. 10); so the sheave element stays retained in its original position. However, when the gate 210 has moved to a different radial reference than the passing sheave elements, the head 82 of each passing sheave element is constrained to travel along the channel indicated by the arrow labelled "R." This path causes the pin head of the sheave element to be forced inward (as in FIG. 8), which releases the sheave element so that it can move radially.

Figure 10:
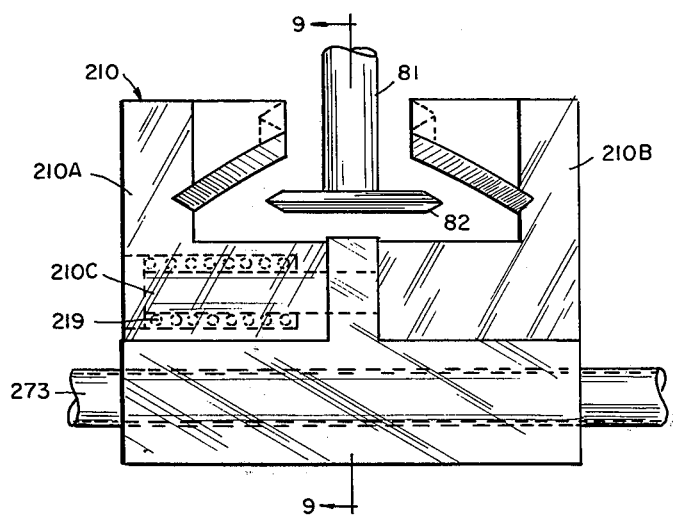

In addition to its function of effecting release of non-aligned sheave elements, the gate 210 also serves to deflect each released sheave element (by deflecting its pin head 82) so that it realigns itself with the gate; as is illustrated in FIG. 10. The head 82 of a sheave element is shown in the "aligned" position, and it is seen that its passage through the gate 210 is unobstructed, i.e. along the channel depicted by arrow N in FIG. 9. However, when the sheave element is at a different radial position than the gate 210, it can be visualized that head 82 will be "captured" and caused to follow the channel depicted by the arrow R; viz. it will, in addition to being depressed (FIG. 9), be forced by the inclined ramp to a position aligned with the center of the gate 210.

In the present embodiment the body of gate 210 comprises a left half, 210A, which has a small cylindrical bore shown in dashed line, and a right half, 210B, which has a pin 210C extending into the bore. The pin 210C has an end annular retaining flange which retains a spring 219 in the bore. The spring mounting allows a portion of gate 210 to yield temporarily when contacted by the pin head 82 of a sheave element (in the non-aligned case). During traversal of the pin head 82, the spring 219 dominates and causes the portion of gate 210 to return to its original position. The purpose of this provision is to allow effective flexibility of the gate ramp during initial contact with the sheave element head 72, thereby avoiding severe deflection of a sheave element which may have not as yet been fully released from locking in the track 123.

I claim:

1. A variable speed drive for a bicycle, comprising:
   a variable diameter driving mechanism rotatably mountable on said bicycle, said mechanism including a mounting plate having a plurality of radial tracks therein;
   a plurality of movable sheave elements each being mounted in one of said tracks, each sheave element having a releasable retaining means which normally retains it at a substantially fixed radial position in its track;
   flexible driving means partially wrapped around said driving mechanism and engaging different adjacent ones of said sheave elements depending on the rotational orientation of said driving mechanism;
   gate means positioned to sequentially coact with the non-engaged sheave elements and operative, under manual control, to release the retaining means of a sheave element to allow radial motion of said sheave element; and
   means for applying a radial bias to the released sheave elements.

2. The variable speed drive as defined by claim 1 wherein said gate means is movable radially under manual control.

3. The variable speed drive as defined by claim 2 wherein said gate means coacts with said sheave elements only when said gate means is at a different radial reference than said sheave elements.

4. The variable speed drive as defined by claim 3 wherein said radial bias is applied to said released sheave elements by said gate means.

5. The variable speed drive as defined by claim 2 wherein said manual control is powered by rotation of said driving mechanism.

6. A variable speed drive as defined by claim 2 wherein each sheave element has two symmetrical arcuate belt-carrying surfaces on opposite sides of said housing plate.

7. A variable speed drive as defined by claim 6 wherein each belt-carrying surface is double v-grooved.

8. The variable speed drive as defined by claim 7 wherein said flexible driving means comprises a pair of multiple-v belts.

9. The variable speed drive as defined by claim 1 wherein said flexible driving means is a belt.

10. The variable speed drive as defined by claim 9 wherein said belt is a multiple-v belt.

11. The variable speed drive for a bicycle comprising a pair of drives as defined by claim 1, said drives being adapted for coupling respectively to the pedal drive and rear wheel of said bicycle.

12. The variable speed drive as defined by claim 11 wherein the gate means of said pair of drives are mechanically linked together, and further comprising means for moving the two gate means in coordinated opposite relationship such that when one gate means moves radially inward with respect to its driving mechanism the other gate means moves radially outward with respect to its driving mechanism.

13. A variable speed drive, comprising:
  a variable diameter rotatable driving mechanism, said mechanism including a mounting plate having a plurality of radial tracks therein;
  a plurality of movable sheave elements each being mounted in one of said tracks, each sheave element having a releasable retaining means which normally retains it at a substantially fixed radial position in its track;
  flexible driving means partially wrapped around said driving mechanism and engaging different adjacent ones of said sheave elements depending on the rotational orientation of said driving mechanism;
  gate means positioned to sequentially coact with the non-engaged sheave elements and operative, under manual control, to release the retaining means of a sheave element to allow radial motion of said sheave element; and
  means for applying a radial bias to the released sheave elements.

14. The variable speed drive as defined by claim 13 wherein said gate means is movable radially under manual control.

15. The variable speed drive as defined by claim 14 wherein said gate means coacts with said sheave elements only when said gate means is at a different radial reference than said sheave elements.

16. A variable speed drive as defined by claim 14 wherein each sheave element has two symmetrical arcuate belt-carrying surfaces on opposite sides of said housing plate.

17. The variable speed drive for a bicycle comprising a pair of drives as defined by claim 13, said drives being adapted for coupling respectively to a driving axis and a driven axis.

18. The variable speed drive as defined by claim 17 wherein the gate means of said pair of drives are mechanically linked together, and further comprising means for moving the two gate means in coordinated opposite relationship such that when one gate means moves radially inward with respect to its driving mechanism the other gate means moves radially outward with respect to its driving mechanism.

* * * * *